(12) United States Patent
Kuriakose et al.

(10) Patent No.: US 8,777,543 B2
(45) Date of Patent: Jul. 15, 2014

(54) ROLLBACK CARRIER GRAVITY TILT DAMPENING SYSTEM

(75) Inventors: Sanjeev T. Kuriakose, Shippensburg, PA (US); Jeffrey L. Addleman, Chambersburg, PA (US)

(73) Assignee: Jerr-Dan Corporation, Greencastle, PA (US)

( * ) Notice: Subject to any disclaimer, the term of this patent is extended or adjusted under 35 U.S.C. 154(b) by 824 days.

(21) Appl. No.: 12/948,076

(22) Filed: Nov. 17, 2010

(65) Prior Publication Data

US 2012/0121368 A1    May 17, 2012

(51) Int. Cl.
*B60P 1/04* (2006.01)

(52) U.S. Cl.
USPC .......................................................... 414/477

(58) Field of Classification Search
USPC .......................................... 414/477, 478, 480
See application file for complete search history.

(56) References Cited

U.S. PATENT DOCUMENTS

| | | | | |
|---|---|---|---|---|
| 2,911,230 A * | 11/1959 | Peras | ............................ | 280/104 |
| 4,318,657 A * | 3/1982 | Znidaric | ........................ | 414/478 |
| 4,786,034 A * | 11/1988 | Heess et al. | ................ | 267/64.15 |
| 4,813,841 A * | 3/1989 | Eischen | ........................ | 414/477 |
| 5,246,329 A * | 9/1993 | Farrell | .......................... | 414/478 |
| 5,411,284 A * | 5/1995 | Harbin | .......................... | 280/656 |
| 5,782,514 A * | 7/1998 | Mann | ............................ | 293/118 |
| 5,951,235 A | 9/1999 | Young et al. | | |
| 6,336,783 B1 | 1/2002 | Young et al. | | |
| 6,447,239 B2 | 9/2002 | Young et al. | | |
| 8,215,893 B2 * | 7/2012 | Simpson | ........................ | 414/478 |
| 2007/0104560 A1 * | 5/2007 | Hall | ............................. | 414/494 |
| 2011/0038698 A1 * | 2/2011 | Li | ................................ | 414/479 |

* cited by examiner

*Primary Examiner* — James Keenan
(74) *Attorney, Agent, or Firm* — Nixon & Vanderhye P.C.

(57) ABSTRACT

A rollback carrier includes a vehicle chassis, a truck bed assembly supported on the vehicle chassis and displaceable between a transport position and a loading position, and a front actuating arm acting between the truck bed assembly and the vehicle chassis. The front actuating arm dampens a tilt position of the truck bed relative to the vehicle chassis.

17 Claims, 9 Drawing Sheets

ROLLBACK CARRIER GRAVITY TILT DAMPENING SYSTEM

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The invention relates to a rollback carrier that uses a gravity-based tilt system to lower and raise a truck bed into loading and transport positions. A conventional carrier, in contrast, has an independent set of hydraulic tilt cylinders specifically to actuate and control the tilting of the bed no matter the horizontal position of the bed, load or center of gravity.

The gravity-based system makes use of a rear stabilizer frame that is deployed and articulated to control the tilting function of the bed once the operator moves the combined center of gravity of the bed and the cargo (equipment, vehicle, etc.) horizontally (forward/aft) beyond the pivot point on the chassis. If the center of gravity is behind the pivot point, the bed will tend to tilt down into the loading position. If the center of gravity is forward of the pivot point, the bed will tend to tilt back to the flat transport position.

The invention addresses a service life concern with the existing gravity-based tilt design in the event of a loaded bed rapidly lowering or raising. The concern also arises if more than one piece of heavy equipment is loaded front to back on the bed. If the rear stabilizer frame is not deployed at the correct time or distance, the bed and any cargo on it will lower rapidly into the loading or transport position, providing the operator minimal time to react. In the case of multiple pieces of equipment loaded on the bed, when one piece of equipment is unloaded or loaded behind the first piece, the operational dynamics and center of gravity changes significantly, which could leave an inexperienced or inattentive operator in a potentially unfamiliar situation. The possible results of these dynamic scenarios are:

a. shifting the loaded equipment into an undesirable position for transport or removal;

b. operator disorientation due to a dynamic event which was unexpected;

c. potential damage to the chassis;

d. potential damage to the ground surface or area under the carrier;

e. potential damage to objects behind or around the carrier f. etc.

BRIEF SUMMARY OF THE INVENTION

The solution comprises a self-contained and controlled hydraulic dampening system that does not require any operator interaction. An important purpose of the system is to provide a controlled descent in the event of the scenarios presented above. The system provides additional time for the operator to react, if required, to control the operation.

In an exemplary embodiment, a rollback carrier includes a vehicle chassis, a sub-frame pivotably secured to the vehicle chassis via a trunnion, and a truck bed supported on the sub-frame and displaceable between a transport position and a loading position via a gravity based tilt system. A rear stabilizer frame is secured on an underside of the sub-frame between the sub-frame and the trunnion. The rear stabilizer frame is positionable between a deployed position and a retracted position. A front actuating arm acts between the sub-frame and the trunnion and dampens a tilt position of the truck bed via the sub-frame relative to the vehicle chassis.

In a preferred arrangement, the front actuating arm is at least one hydraulic cylinder including a rod end secured to one of the trunnion and the sub-frame and a head end secured to the other of the trunnion and the sub-frame. In this context, the rollback carrier may further include a main hydraulic circuit driving operating components of the rollback carrier and the gravity based tilt system, and an arm hydraulic circuit branching off of the main hydraulic circuit and in fluid communication with the front actuating arm hydraulic cylinder. The arm hydraulic circuit may include a series of check valves and pressure compensated flow controls that maintain a speed of hydraulic fluid in the arm hydraulic circuit and that control fluid flow through the arm hydraulic circuit and between the arm hydraulic circuit and the main hydraulic circuit. Still further, the arm hydraulic circuit may comprise a first flow restrictor in series with the rod end of the hydraulic cylinder and a second flow restrictor in series with the head end of the hydraulic cylinder, where the first and second flow restrictors have different flow rate control settings to compensate for volume differences between the rod end and the head end. The arm hydraulic circuit may still additionally include a preset pressure relief valve for each of the rod end cylinder stroke and the head end cylinder stroke.

In an alternative arrangement, the hydraulic cylinder is constructed with equal volumes on the rod end and the head end. In this context, the hydraulic cylinder may include a piston that is movable with a piston rod between an extended position and a retracted position, a primary head disposed in the head end of the hydraulic cylinder, and a secondary head disposed in the rod end of the cylinder. The primary head is sized differently than the secondary head to maintain the equal volumes. The hydraulic cylinder may include a rod extension disposed on a distal end of the piston rod, and the secondary head may include an opening therein that receives the rod extension.

In another exemplary embodiment, a rollback carrier includes a vehicle chassis; a sub-frame pivotably secured to the vehicle chassis via a trunnion; a truck bed supported on the sub-frame and displaceable between a transport position and a loading position via a gravity based tilt system; a rear stabilizer frame secured on an underside of the sub-frame between the sub-frame and the trunnion, where the rear stabilizer frame is positionable between a deployed position and a retracted position; and a front actuating arm comprising a hydraulic cylinder acting between the sub-frame and the trunnion, where the front actuating arm dampens a tilt position of the truck bed via the sub-frame relative to the vehicle chassis, and where a piston rod of the hydraulic cylinder is extended as the sub-frame is pivoted and the truck bed is displaced toward the loading position.

In still another exemplary embodiment, a rollback carrier includes a vehicle chassis, a truck bed assembly supported on the vehicle chassis and displaceable between a transport position and a loading position, and a front actuating arm acting between the truck bed assembly and the vehicle chassis. The front actuating arm dampens a tilt position of the truck bed relative to the vehicle chassis. The truck bed assembly may include a sub-frame pivotably secured to the vehicle chassis and a truck bed movably supported on the sub-frame, where the front actuating arm acts between the sub-frame and the vehicle chassis.

BRIEF DESCRIPTION OF THE DRAWINGS

These and other aspects and advantages of the invention will be described in detail with reference to the accompanying drawings, in which.

DETAILED DESCRIPTION OF THE INVENTION

Figure 1:
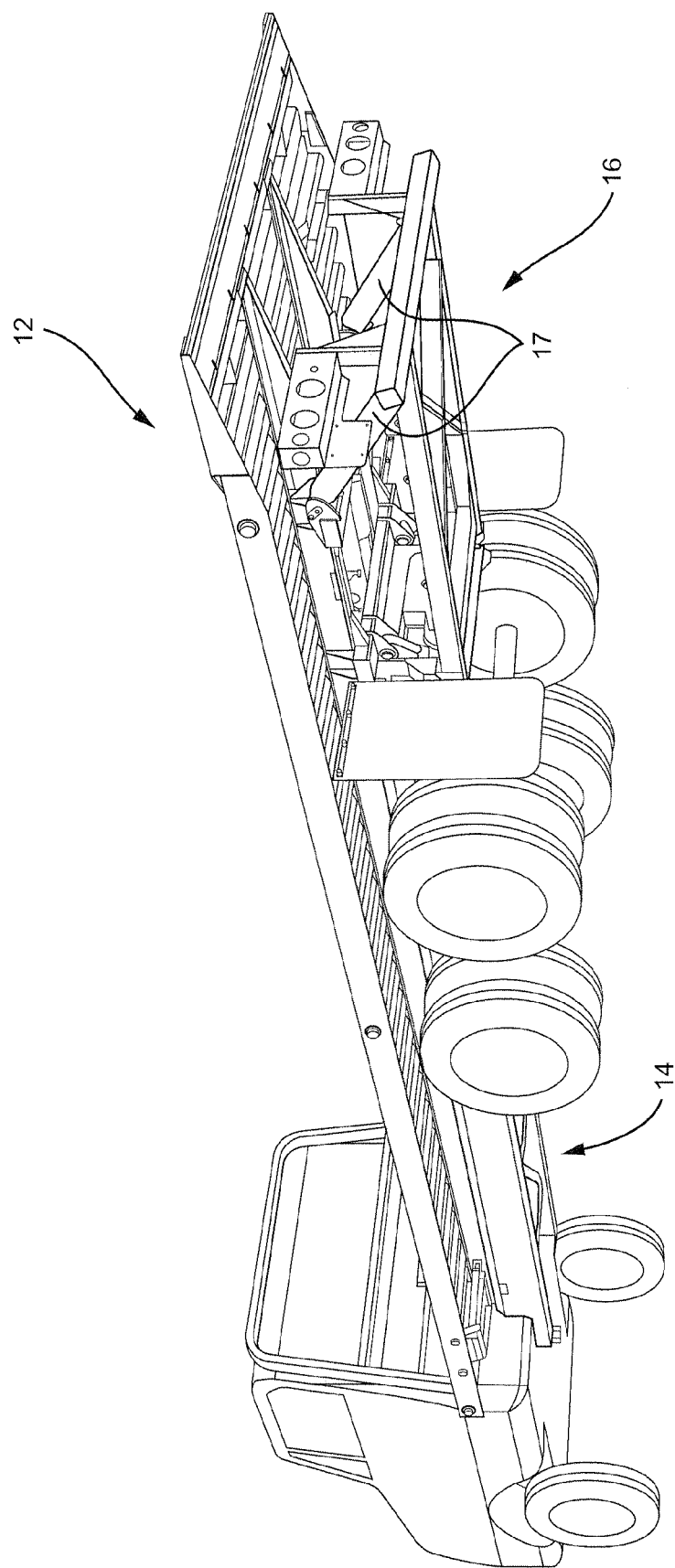
FIG. 1 is a perspective view of a rollback carrier with the truck bed in a transport position.
Figure 2:
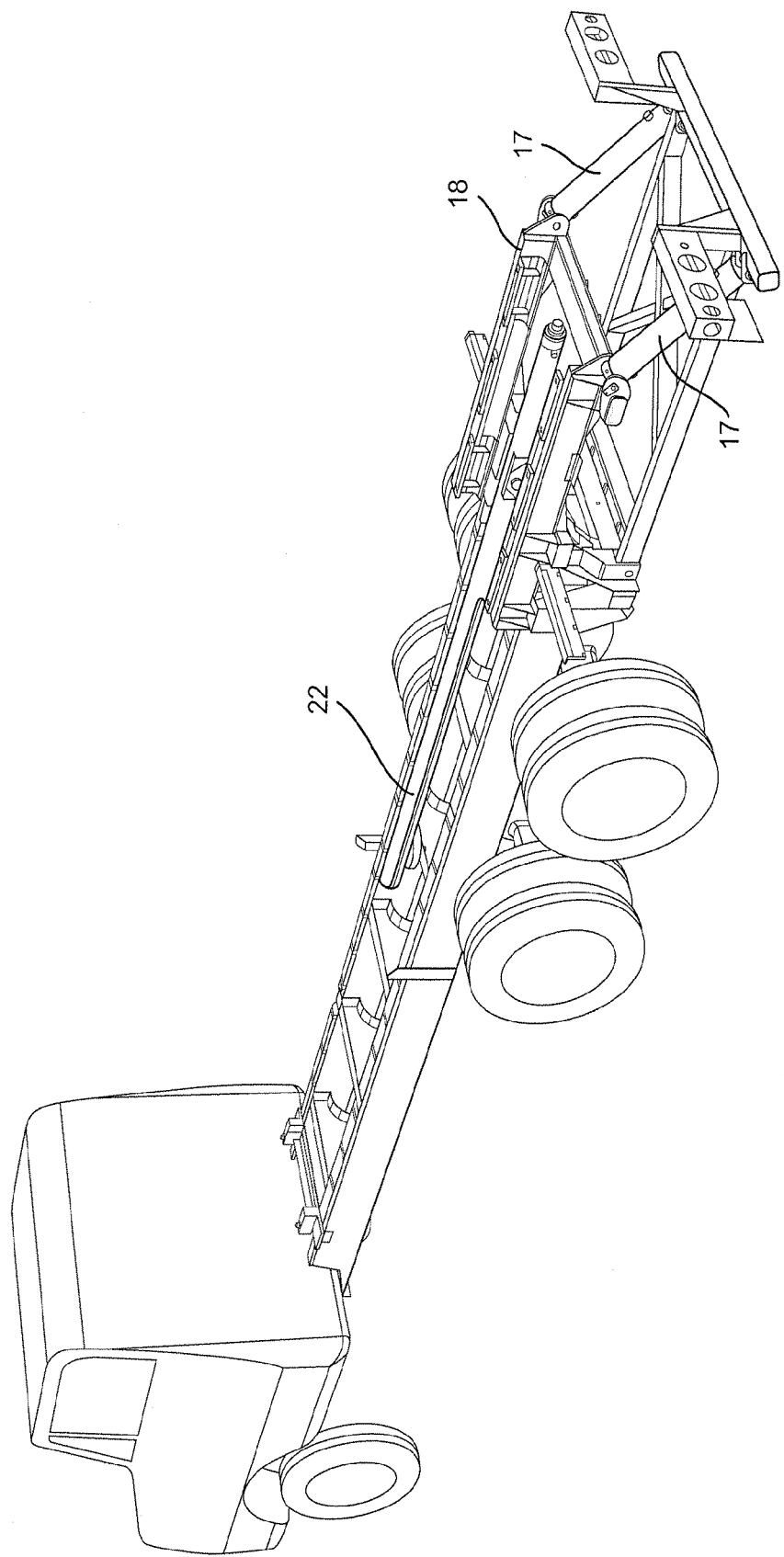
FIG. 2 is a perspective view with the truck bed removed.
Figure 3:
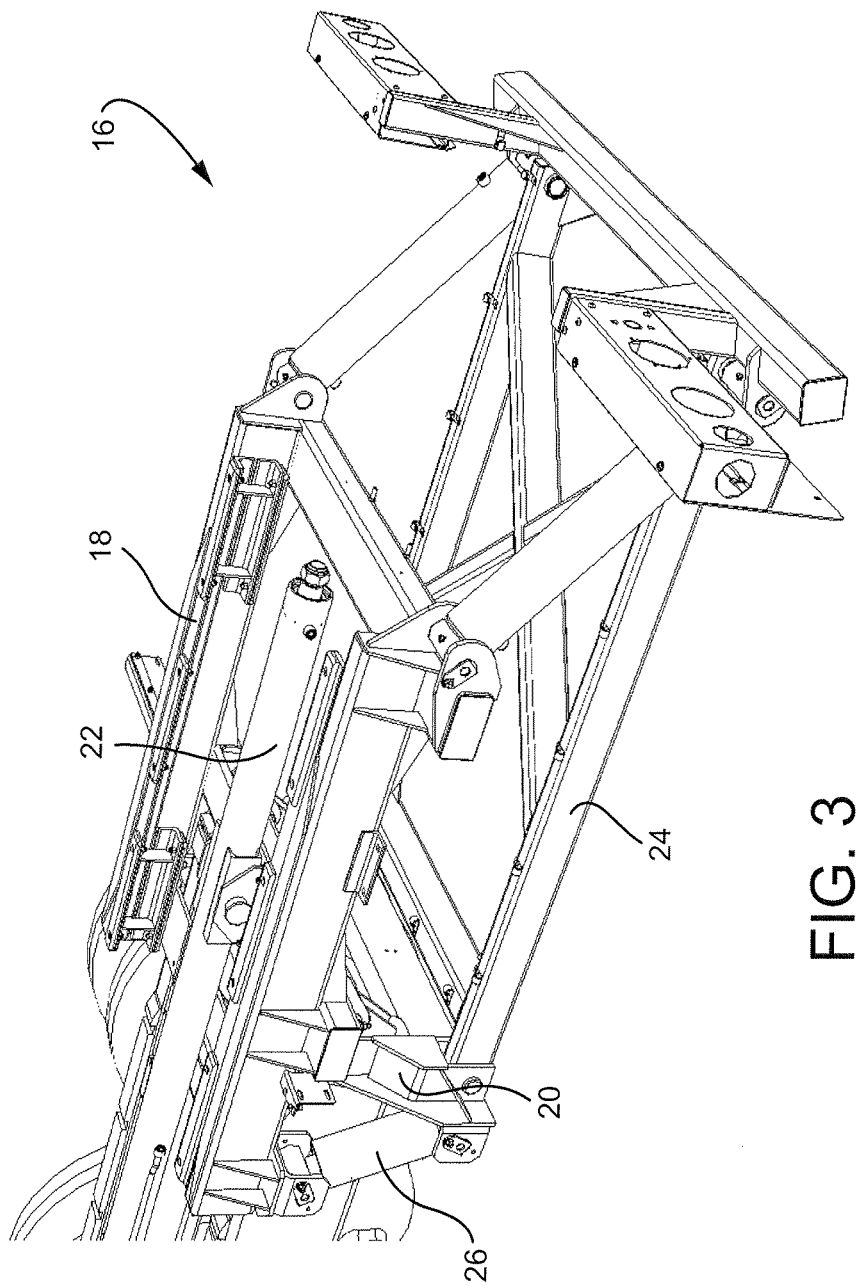
FIGS. 3-6 are various views of the rear stabilizer frame and front actuating arm.
Figure 4:
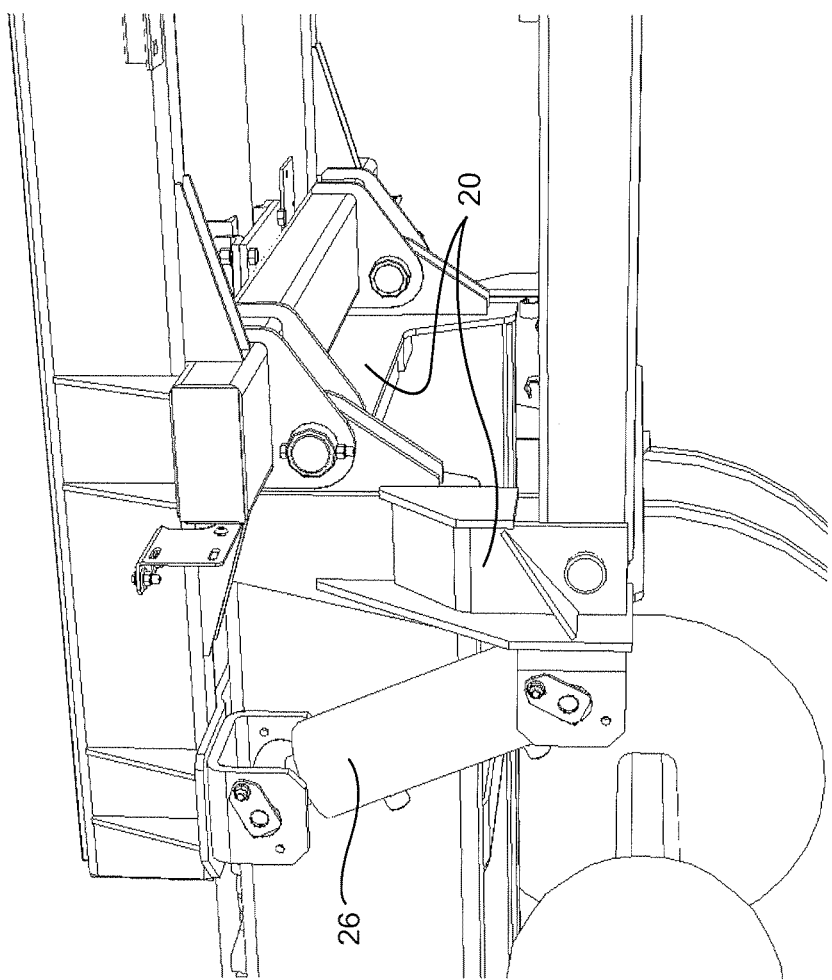
Figure 5:
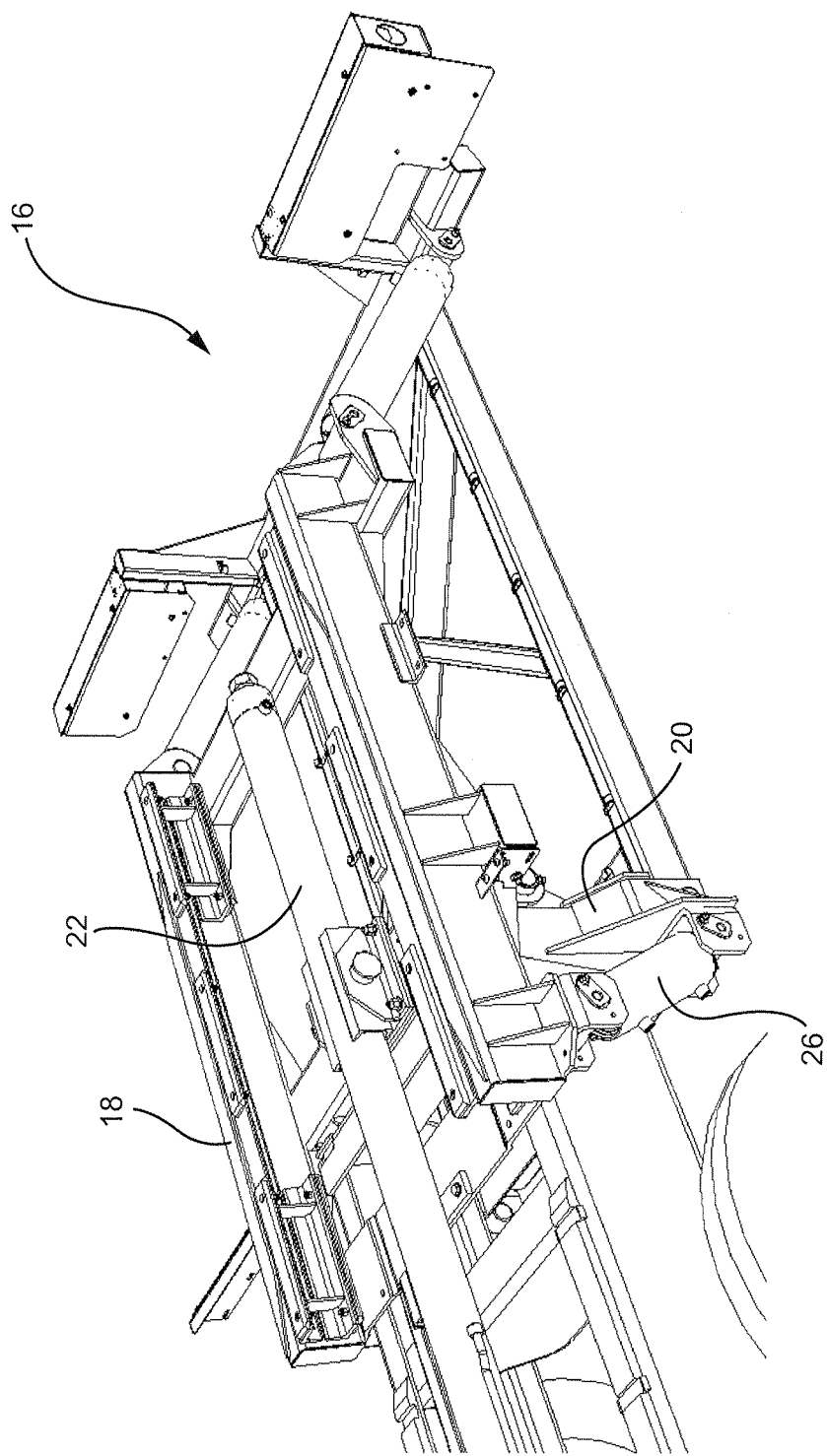
Figure 6:
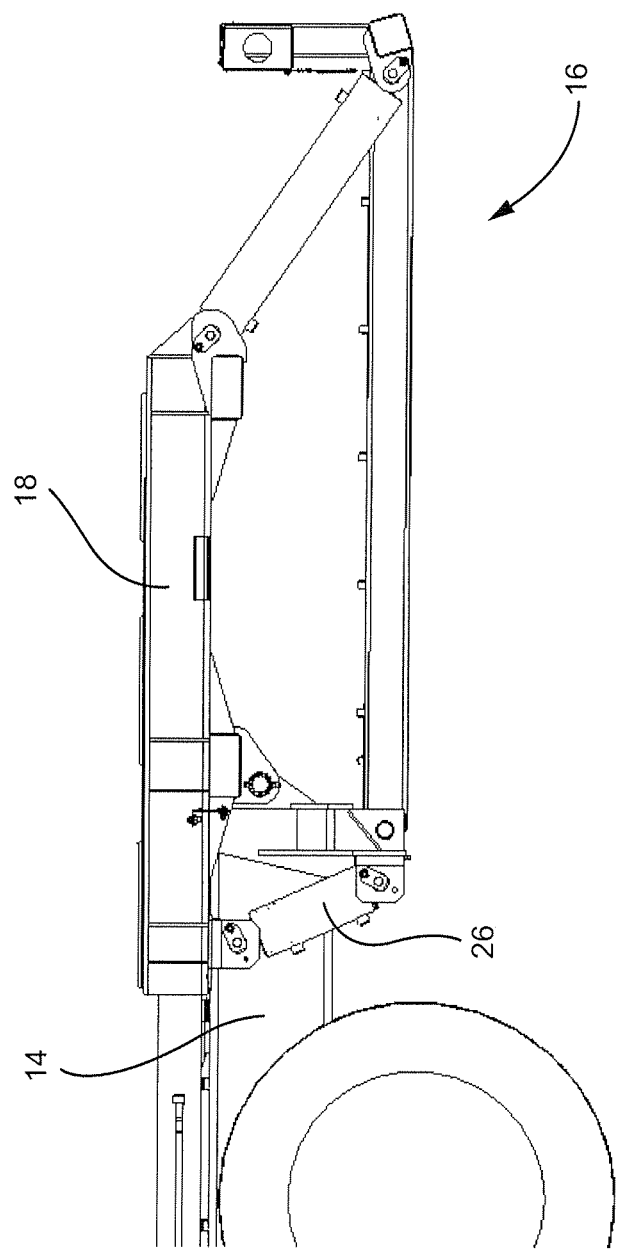

With reference to FIGS. 1 and 2, a rollback carrier that uses a gravity-based tilt system includes a movable truck bed 12 that is displaceable between transport and loading positions relative to a vehicle chassis 14. A rear stabilizer frame 16 is secured on an underside of the truck bed 12 and is positionable between a deployed position and a retracted position via a cylinder arrangement 17.

With continued reference to FIG. 2, and with reference to FIGS. 3-6, a sub-frame 18 is pivotably secured to the vehicle chassis 14 via a trunnion 20. The truck bed 12 is supported on the sub-frame 18 and is movable horizontally relative to the sub-frame 18 by a main roll cylinder 22. The interaction and relative movement of the truck bed 12 and the sub-frame 18 via the main roll cylinder 22 is conventional and well-known, and further details will not be described.

In operation, in order to displace the truck bed 12 from the transport position (shown in FIG. 1) to a loading position, the rear stabilizer frame 16 is extended to its deployed position in which a support bar or frame 24 engages the ground. The truck bed 12 is driven rearward by the main roll cylinder 22 and is displaced essentially horizontally relative to the sub-frame 18. As the truck bed 12 is moved rearwardly, a center of gravity of the truck bed 12 is shifted closer to a position over the rear stabilizer frame 16. The rear stabilizer frame 16 can then be retracted, thereby causing the truck bed 12 to tilt toward the loading position by gravity. Once the cargo is loaded on the truck bed 12, the rear stabilizer frame 16 can be extended again to its deployed position via the cylinders 17, re-leveling the truck bed 12 to an essentially horizontal position. The truck bed 12 is then moved horizontally via the main roll cylinder 22 back to the transport position.

Figure 7:
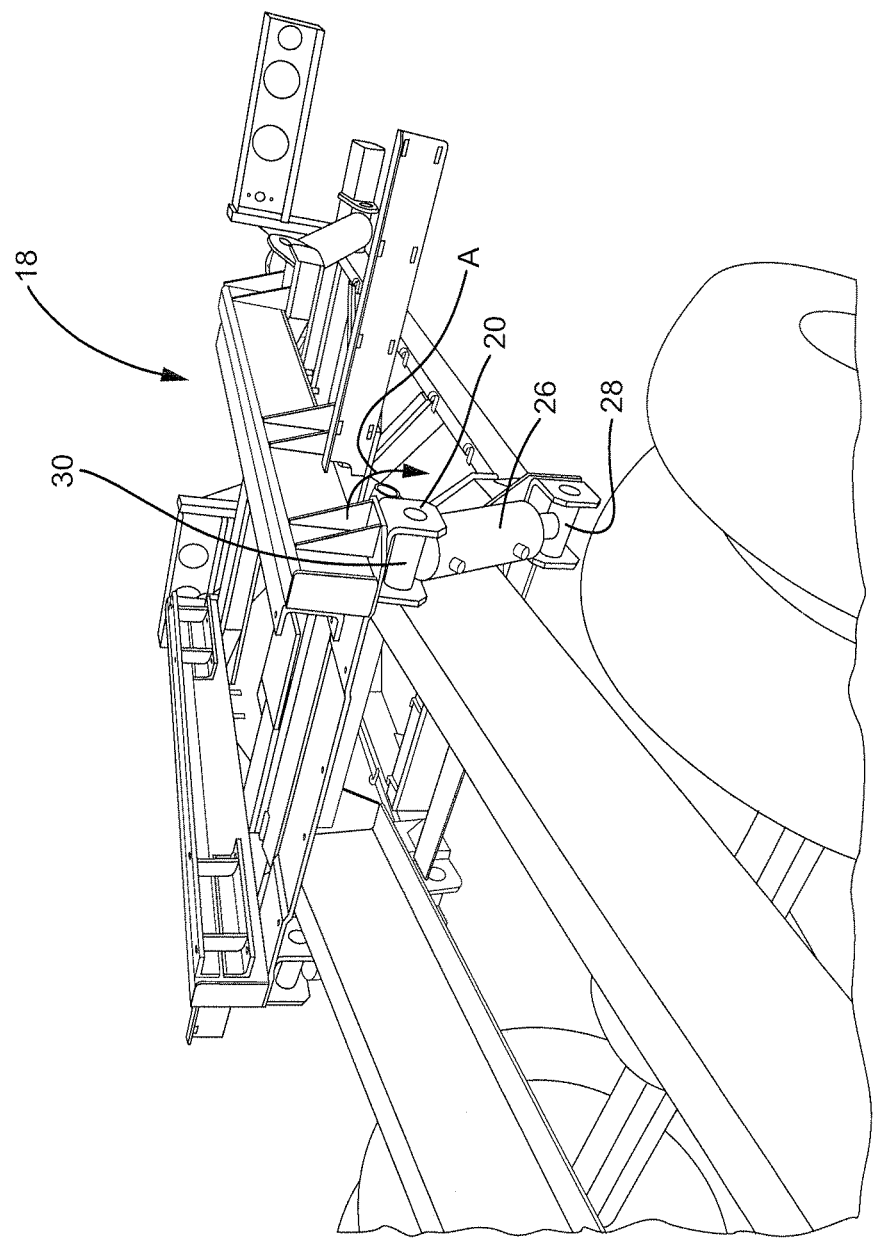
FIG. 7 is a perspective view showing the sub-frame pivoted toward a loading position.

As discussed above, a problem arises with the conventional gravity-based tilt design in the event of a loaded bed rapidly lowering or raising, which could occur if the operator forgets to extend the rear stabilizer frame 16 before displacing the truck bed 12. Moreover, in the case of multiple pieces of equipment loaded on the bed 12, when one piece of equipment is unloaded or loaded behind the first piece, the operational dynamics and center of gravity changes significantly, which could lead an inexperienced or inattentive operator in a potentially unfamiliar situation. To overcome this problem, the system includes a front actuating arm 26, which is preferably a hydraulic cylinder, acting between the sub-frame 18 and the trunnion 20. That is, as the sub-frame 18 pivots with the truck bed 12 between its transport position and its loading position, the front actuating arm 26 extends and retracts to dampen a tilt position of the truck bed 12 via the sub-frame 18 relative to the vehicle chassis 14. In particular, as shown in FIG. 7, as the sub-frame 18 pivots relative to the vehicle chassis 14 via the trunnion 20 (see arrow A in FIG. 7), a piston rod 28, which is fixed to the trunnion 20 is extended as an opposite end 30 of the front actuating arm 26, which is fixed to the sub-frame 18, is displaced upwardly. With the use of a hydraulic cylinder as the front actuating arm 26, a tilt position of the truck bed 12 can be dampened. Preferably, the assembly includes two front actuating arms 26, one on each side of the vehicle.

Figure 8:
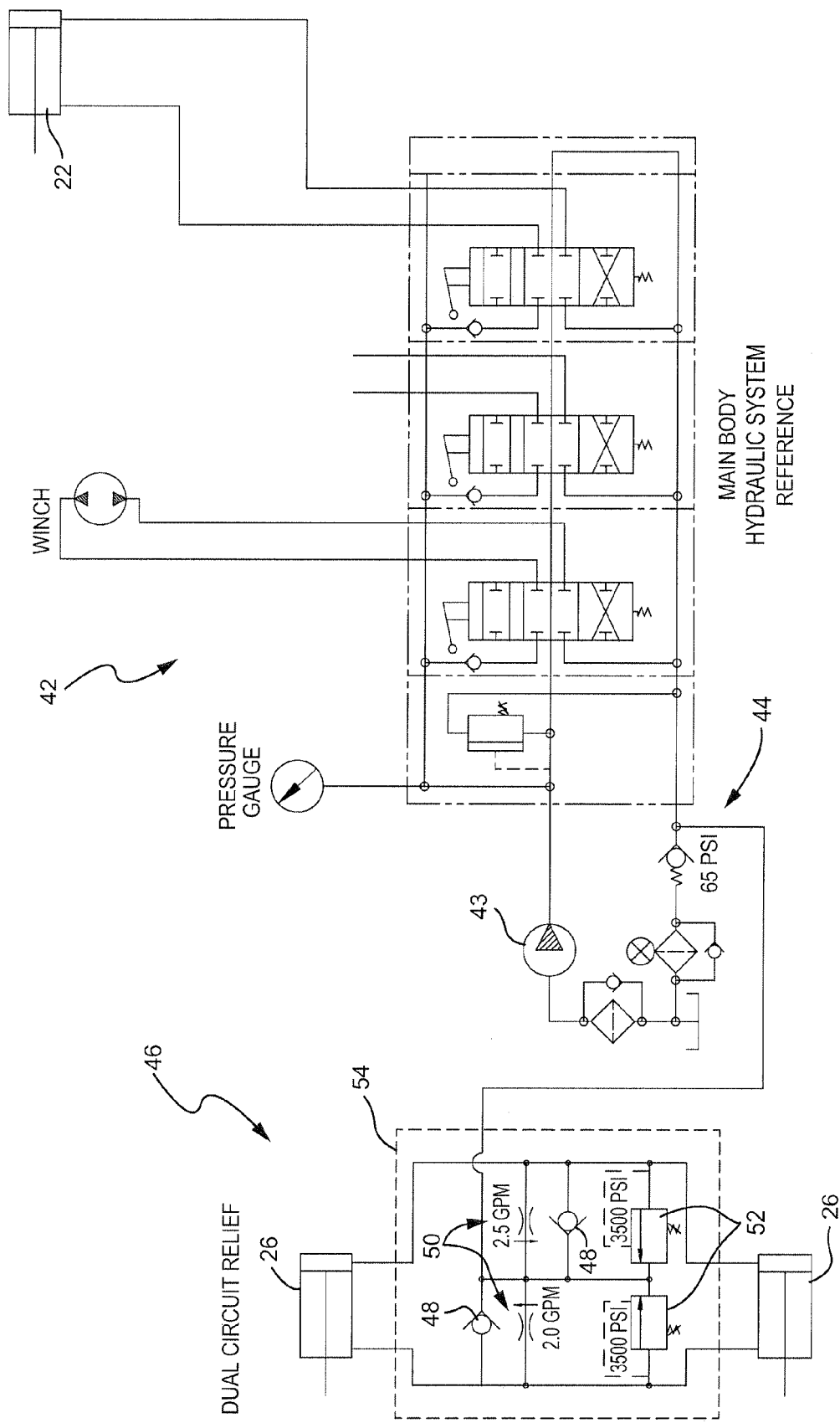
FIG. 8 is an exemplary schematic diagram of the hydraulic system.

As noted, in a preferred embodiment, the front actuating arm 26 is a hydraulic cylinder with the rod end 28 secured to one of the trunnion 20 and the sub-frame 18 and the head end 30 secured to the other of the trunnion 20 and the sub-frame 18. FIG. 8 is an exemplary schematic drawing of the hydraulic system for driving operating components of the rollback carrier and the gravity-based tilt system. The diagram shows the main hydraulic circuit 42. The main hydraulic circuit 42 is conventional, and details of the circuit will not be described. The circuit 42 generally drives the components of the vehicle including the main roll cylinder 22, and a winch attached adjacent the truck bed. A pump 43 drives the flow of hydraulic fluid through the circuit 42.

As shown at 44 in FIG. 8, the main circuit 42 is tapped at the return flow feed. A back pressure is generated through a controlled restriction, and a secondary hydraulic control system or arm hydraulic circuit 46 can be fed with low pressure hydraulic fluid. The arm hydraulic circuit 46 serves to move hydraulic fluid between the rod side and the barrel or head side of the front actuating arm(s) 26. The cylinders 26 act in tandem as dampening or shock absorbing devices.

A concern with just having a cylinder filled with fluid that moves back and forth, from the rod side to the barrel side, is the difference in volume between the two sides of the cylinder. The rod side tends to always be smaller in volume (as much as two times less in conventional cylinders) compared to the barrel side. As such, there may be insufficient fluid to fill the barrel side, causing the remaining air gap in the cylinder to collapse rapidly. Another risk is that there is too much fluid left over once the rod side is filled, and the cylinder cannot operate correctly over the entire stroke due to excess fluid pressurizing and working on both sides of the piston. Another concern is the difference in speed of the fluid as it evacuates the two different-size volumes (rod side and barrel side). The smaller volume will always evacuate quicker for the same stroke as compared to the larger volume. This would reduce the level of control required for the system.

In order to maintain the speed of the fluid and control the flow through the system between the arm hydraulic circuit 46 and the main hydraulic circuit 42, a series of check valves 48 and pressure compensated flow controls 50 will be used as shown. There is an independent flow rate control setting for each side of the piston to compensate for the difference in volume between the rod side and the barrel side of the cylinder. The arm hydraulic circuit 56 includes a first flow restrictor 50 in series with the rod end of the hydraulic cylinder and a second flow restrictor 50 in series with a head end of the hydraulic cylinder. As shown in FIG. 8, the first and second flow restrictors 50 have different flow rate control settings to compensate for the volume differences. This construction provides more equivalent cylinder displacement times for both the rod and barrel side of the cylinder stroke. Additionally, the speed of the system will not be significantly affected by the amount of cargo/payload on the carrier.

In order to protect the hydraulic system and the structural components of the body and chassis frame from excessive loading, the arm hydraulic circuit 46 includes a preset pressure relief valve 52 for each of the rod end cylinder stroke and the head end cylinder stroke. The pressure relief valves 52 allow the system to get rid of excessive pressure buildup before any structural damage occurs. The entire system is packaged in a compact custom manifold block 54 to reduce real estate requirement and facilitate service access to the components.

Figure 9:
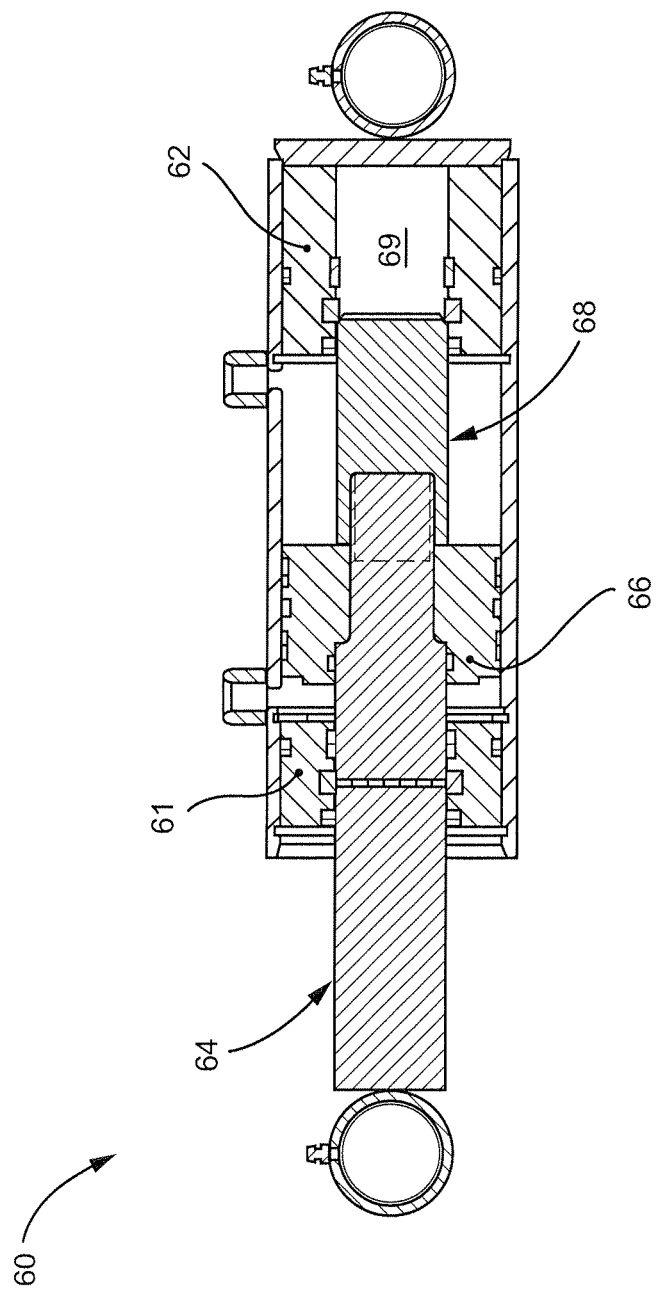
FIG. 9 is a cross-sectional view of an equal volume cylinder.

As an alternative to the use of custom hydraulic controls for compensating for volume differences, another solution is an equal volume cylinder. With reference FIG. 9, an equal volume cylinder 60 includes a primary head 61 disposed in the head end of the hydraulic cylinder and a secondary fixed head 62 disposed in the rod end of the cylinder at the base of the cylinder. The primary head 61 is sized differently than the secondary head 62 to maintain equal volumes. A piston rod 64 is displaceable in the cylinder, and a piston 66 is attached to an end of the piston rod 64. A rod extension 68 is disposed on a distal end of the piston rod 64, and the secondary head 62 includes an opening 69 therein that receives the rod extension 68. By extending the rod 64 through the piston 66 and into the secondary head 62, an equal volume can be achieved on both sides. Preferably, the secondary head 62 is sized for the stroke of the cylinder so that the rod extension 68 would never release from the head and be sealed to it through the entire travel distance.

The design provides a mechanism that is simpler to use and manufacture with more compact and fewer moving parts and consequently less maintenance. The design also reduces the overall wear and tear on the chassis and body providing for extended service life and durability.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A rollback carrier comprising:
    a vehicle chassis;
    a sub-frame pivotably secured to the vehicle chassis via a trunnion;
    a truck bed supported on the sub-frame and linearly and pivotably displaceable between a transport position and a loading position via a gravity based tilt system;
    a main roll cylinder connected between the truck bed and the vehicle chassis, the main roll cylinder driving the linear displacement of the truck bed relative to the vehicle chassis;
    a rear stabilizer frame secured on an underside of the sub-frame between the sub-frame and the trunnion, the rear stabilizer frame being positionable between a deployed position and a retracted position; and
    a front actuating arm acting between the sub-frame and the trunnion, the front actuating arm dampening a tilt position of the truck bed via the sub-frame relative to the vehicle chassis.

2. A rollback carrier according to claim 1, wherein the front actuating arm comprises a hydraulic cylinder including a rod end secured to one of the trunnion and the sub-frame and a head end secured to the other of the trunnion and the sub-frame.

3. A rollback carrier according to claim 2, comprising two front actuating arms.

4. A rollback carrier according to claim 2, further comprising a main hydraulic circuit driving operating components of the rollback carrier and the gravity based tilt system, and an arm hydraulic circuit branching off of the main hydraulic circuit and in fluid communication with the front actuating arm hydraulic cylinder.

5. A rollback carrier according to claim 4, wherein the arm hydraulic circuit comprises a series of check valves and pressure compensated flow controls that maintain a speed of hydraulic fluid in the arm hydraulic circuit and that control fluid flow through the arm hydraulic circuit and between the arm hydraulic circuit and the main hydraulic circuit.

6. A rollback carrier according to claim 5, wherein the arm hydraulic circuit comprises a first flow restrictor in series with the rod end of the hydraulic cylinder and a second flow restrictor in series with the head end of the hydraulic cylinder, the first and second flow restrictors having different flow rate control settings to compensate for volume differences between the rod end and the head end.

7. A rollback carrier according to claim 6, wherein the arm hydraulic circuit comprises a preset pressure relief valve for each of the rod end cylinder stroke and the head end cylinder stroke.

8. A rollback carrier according to claim 2, wherein the hydraulic cylinder is constructed with equal volumes on the rod end and the head end.

9. A rollback carrier according to claim 8, wherein the hydraulic cylinder comprises a piston that is movable with a piston rod between an extended position and a retracted position, a primary head disposed in the head end of the hydraulic cylinder, and a secondary head disposed in the rod end of the cylinder, wherein the primary head is sized differently than the secondary head to maintain the equal volumes.

10. A rollback carrier according to claim 9, wherein the hydraulic cylinder comprises a rod extension disposed on a distal end of the piston rod, and wherein the secondary head includes an opening therein that receives the rod extension.

11. A rollback carrier according to claim 1, comprising two front actuating arms.

12. A rollback carrier comprising:
    a vehicle chassis;
    a sub-frame pivotably secured to the vehicle chassis via a trunnion;
    a truck bed supported on the sub-frame and linearly and pivotably displaceable between a transport position and a loading position via a gravity based tilt system;
    a main roll cylinder connected between the truck bed and the vehicle chassis, the main roll cylinder driving the linear displacement of the truck bed relative to the vehicle chassis;
    a rear stabilizer frame secured on an underside of the sub-frame between the sub-frame and the trunnion, the rear stabilizer frame being positionable between a deployed position and a retracted position; and
    a front actuating arm comprising a hydraulic cylinder acting between the sub-frame and the trunnion, the front actuating arm dampening a tilt position of the truck bed via the sub-frame relative to the vehicle chassis, wherein a piston rod of the hydraulic cylinder is extended as the sub-frame is pivoted and the truck bed is displaced toward the loading position.

13. A rollback carrier according to claim 12, further comprising a main hydraulic circuit driving operating components of the rollback carrier and the gravity based tilt system, and an arm hydraulic circuit branching off of the main hydraulic circuit and in fluid communication with the front actuating arm hydraulic cylinder, wherein when the piston rod is extended, hydraulic fluid is controllably displaced in the arm hydraulic circuit.

14. A rollback carrier according to claim 13, wherein the arm hydraulic circuit comprises a series of check valves and pressure compensated flow controls that maintain a speed of hydraulic fluid in the arm hydraulic circuit and that control hydraulic fluid flow through the arm hydraulic circuit and between the arm hydraulic circuit and the main hydraulic circuit.

15. A rollback carrier according to claim 14, wherein the arm hydraulic circuit comprises a first flow restrictor in series with a rod end of the hydraulic cylinder and a second flow restrictor in series with a head end of the hydraulic cylinder, the first and second flow restrictors having different flow rate control settings to compensate for volume differences between the rod end and the head end.

16. A rollback carrier according to claim 15, wherein the arm hydraulic circuit comprises a preset pressure relief valve for each of the rod end cylinder stroke and the head end cylinder stroke.

17. A rollback carrier according to claim 12, wherein the hydraulic cylinder is constructed with equal volumes on a rod end and a head end.

* * * * *